United States Patent [19]
Dingfelder

[11] Patent Number: 5,753,013
[45] Date of Patent: May 19, 1998

[54] GAS DRYING APPARATUS AND METHOD

[76] Inventor: Alan W. Dingfelder, 3582 Williams Rd., North East, Pa. 16428

[21] Appl. No.: 771,676

[22] Filed: Dec. 23, 1996

[51] Int. Cl.⁶ .......................... B01D 45/08; B01D 46/50; B01D 50/00
[52] U.S. Cl. .......................... 95/70; 55/442; 55/443; 95/117; 95/118; 95/267; 96/55; 96/64; 96/66; 96/68; 96/69; 96/135; 96/136; 96/139
[58] Field of Search .................... 96/55, 59, 64, 96/69, 66, 68, 134, 135, 136, 139; 95/70, 63, 57, 117, 118, 267, 90; 55/445, 442, 443, 465, 320, 321, 325, 326, 327

[56] References Cited

U.S. PATENT DOCUMENTS

| | | |
|---|---|---|
| 2,974,747 | 3/1961 | Coolidge, Jr. et al. ............ 96/69 |
| 2,990,912 | 7/1961 | Cole ............................ 96/68 |
| 2,992,700 | 7/1961 | Silverman et al. .............. 96/68 |
| 3,705,480 | 12/1972 | Wireman ...................... 96/136 |
| 3,802,163 | 4/1974 | Riojas ........................ 55/321 |
| 3,820,306 | 6/1974 | Vincent ........................ 96/66 |
| 4,354,858 | 10/1982 | Kumar et al. ................. 96/59 |
| 4,624,763 | 11/1986 | Chimenti ...................... 96/68 |
| 4,624,764 | 11/1986 | Mintz et al. .................. 96/68 |
| 4,627,406 | 12/1986 | Namiki et al. ................ 55/322 |
| 5,060,805 | 10/1991 | Fujii et al. .................. 95/57 |

FOREIGN PATENT DOCUMENTS 3134148  3/1983  Germany ....................... 96/66

Primary Examiner—Duane S. Smith
Attorney, Agent, or Firm—William L. Krayer

[57] ABSTRACT

Apparatus for drying flowing gas includes a generally cylindrical vessel having a gas inlet and a gas outlet, two perforated plates of different metals in contact with each other transverse the interior of the vessel, and a third perforated plate downstream from the two mutually contacting plates.

11 Claims, 3 Drawing Sheets

GAS DRYING APPARATUS AND METHOD

TECHNICAL FIELD

This invention relates to apparatus for drying flowing gas. It is of particular use for drying flowing natural gas.

BACKGROUND OF THE INVENTION

Various devices and chemicals have been used to remove moisture from natural gas, particularly when it is flowing. One of the most recent mechanical approaches to come to the attention of the inventor herein is that of Kloberdanz in U.S. Pat. No. 5,531,811. In this patent, an elaborate helical path is contrived for the flowing gas so that a centrifugal effect is applied to the relatively heavy moisture and other liquid to separate it from the gas. Such apparatus is difficult and expensive to fabricate and is generally subject to the observation that the more parts a device has, the more likely it is that something will go wrong with it. Large surface areas and numerous and lengthy intersections of plates and parts are conducive to corrosion. See also Dingfelder U.S. Pat. No. 5,554,209.

The art of gas/liquid separation, particularly that involved with the removal of relatively small amounts of moisture from large amounts of gas moving through gas pipelines, is in need of an inexpensive device which is simple, efficient, and corrosion-resistant.

SUMMARY OF THE INVENTION

I have found that a certain arrangement of perforated plates will enhance the efficiency of moisture removal from natural gas.

Specifically, I use an upstream juxtaposition of perforated carbon and stainless steel plates, and a downstream deployment of a second perforated carbon steel plate, preferably separated from the other two perforated plates by a distance of three to ten inches, for natural gas having the common velocity of 1–2 feet per second within the vessel which holds the plates. This arrangement of perforated plates is used in an expanded vessel—that is, one of larger diameter than the pipeline—providing a simple drain for the liquid recovered. As will be explained below, the dehydrating action of the plates is associated with generation of an electric field which can be converted to current at the cost of drying efficiency.

DETAILED DESCRIPTION OF THE INVENTION

Figure 1:
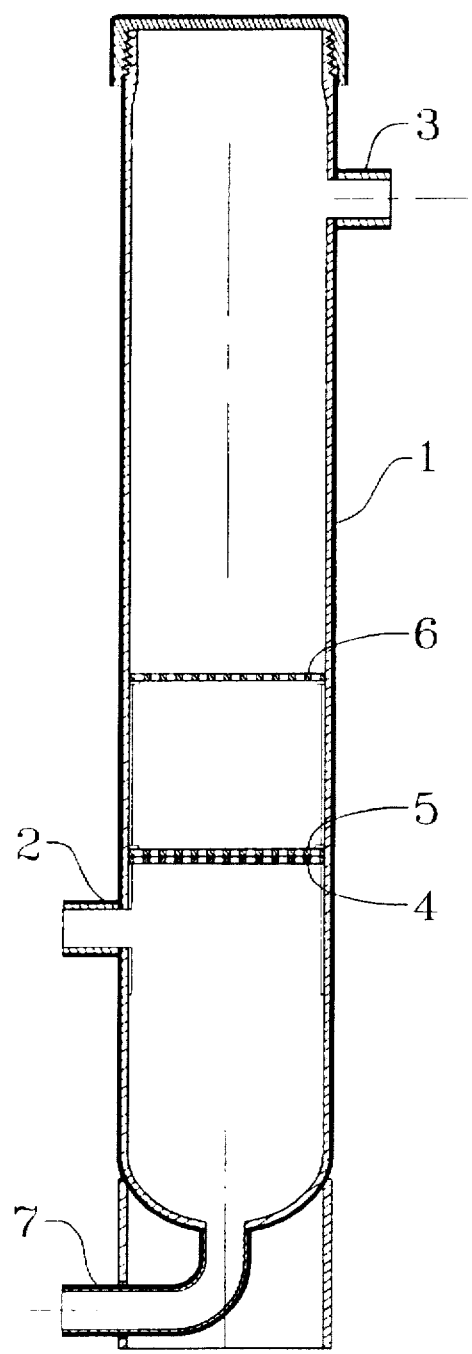
FIG. 1 is a vertical section of my drying vessel.

In FIG. 1, the vessel 1 is seen to have a gas inlet 2 and a gas outlet 3, providing an upward flow of gas. The vessel 1 is generally empty of other solid parts except for perforated plates 4, 5, and 6 which occupy the entire cross section of the vessel 1. Plate 4 is located a short distance above gas inlet 2, and is made of carbon steel. Plate 5 is located directly on top of and contacting plate 4, and is made of stainless steel. Plate 6 is located a short distance, say five inches, above plate 5 and is made of carbon steel. The body of vessel 1 may be made of carbon steel. At the bottom of vessel 1 is drain 7 which leads to a storage container not shown; the drain 7 and the storage container are not exposed to the outside atmosphere, as there is considerable positive pressure inside vessel 1. Dehydrated gas flows from outlet 3 to any desired destination, either to another vessel similar to vessel 1 as will be seen in FIG. 3 or to a pipeline for ultimate consumption. Liquid accumulated through drain 7 will be mostly water, but may include traces of oil from pumps and other machinery in the pipeline and even minute amounts of higher molecular weight hydrocarbons entrained naturally in the gas.

It is believed that the electric potential generated between the two types of steel in perforated plates 4 and 5 either attracts the moisture to the metallic surfaces of plates 4 and 5 or encourages the molecules of water to cohere in the flow patterns through the perforations of plates 4 and 5 and between them; after coalescing, they are highly likely to condense on the upper plate 6. It is further believed the small hydrocarbon component of the removed materials is simply mechanically entrained with the water. However, I do not intend to be bound by any theories as to the etiology of the dehydration of the gas.

The space above perforated plate 6 may be filled partly with solid desiccant tablets, preferably such as are described by Thomas in U.S. patent application Ser. No. 08/633,855 filed Apr. 14, 1996 entitled "Eutectic Drying Composition and Method". Other solid desiccants may also be used. The desiccant will enhance the recovery of water from the gas, causing it to condense and/or be absorbed on the tablets as well as condensing on plate 6.

Figure 2:
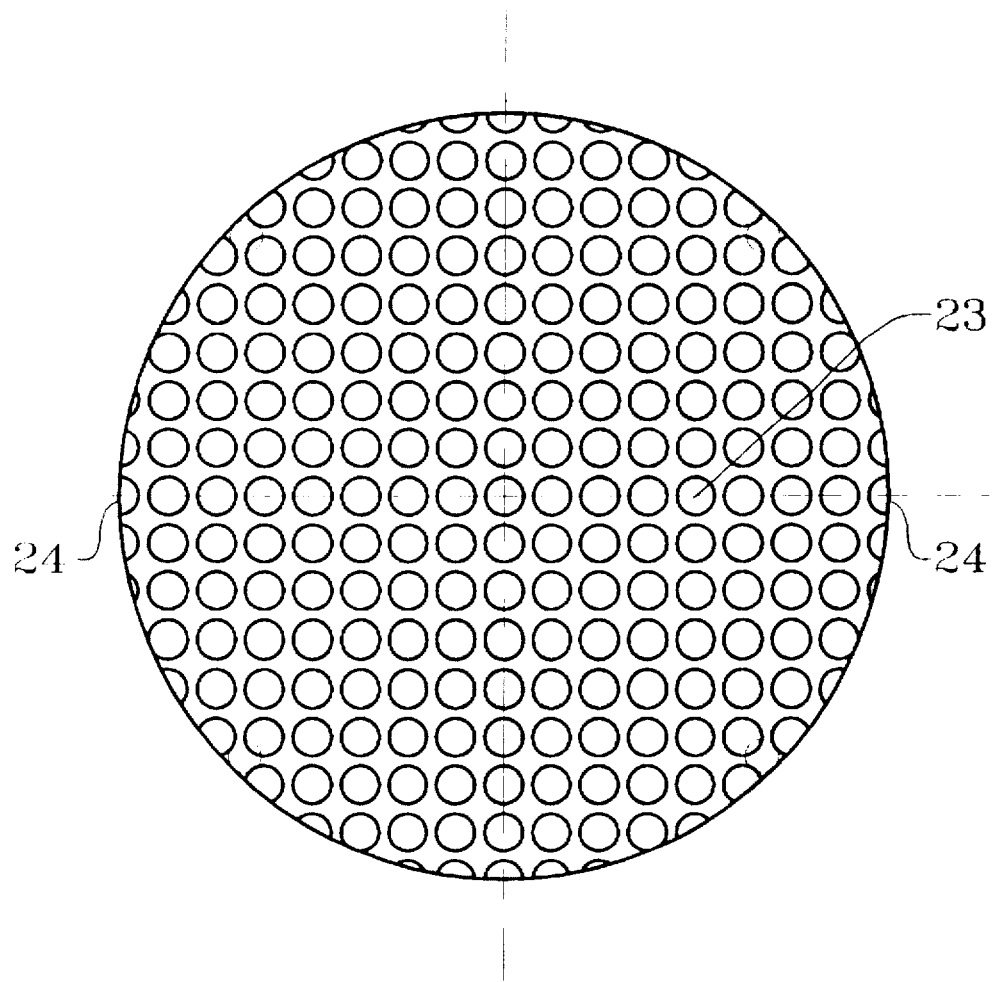
FIG. 2 is an overhead view of one of the perforated plates used in my vessel.

Referring now to FIG. 2, all three perforated plates 4, 5, and 6 preferably have the design shown, i.e. in this case a five inch diameter plate has fourteen complete holes 23 across its diameter and two half holes 24 at the ends of the diameter. Each hole is about 0.75 inch and the space between holes is about 0.25 inch. While these dimensions are not critical, they are preferred, as they have been found to strike a good balance between the necessary pressure drop and the desired moisture removal efficiency. Plates 4 and 5, being directly in contact with each other, must be oriented so their holes are aligned. However, an increased electric potential (again, not wishing to be bound by any theories) may be effected by reducing the surface area of the carbon steel plate 4, as by enlarging the holes 23 or placing additional holes between the ones illustrated, to increase the ratio of the (solid) area of stainless steel plate 5 to that of carbon steel plate 4. Further, the two perforated plates 4 and 5 may be replaced with plates of other metals in the electromotive or galvanic series, with the upstream plate 4 acting as the anode and downstream plate 5 as the cathode. Any pattern of holes which will provide a satisfactory flow rate through both (in contact) will suffice. An example of a possible substitute combination would be an aluminum plate 4 having holes of diameter 0.9 inch and a copper plate 5 having holes (concentric with those of plate 4) of diameter 0.75 inch, the centers of all holes being spaced about an inch apart, thus providing a solid area ratio of about copper 1.5:1 aluminum. Another example is to use the configuration of FIG. 2 for plate 5 and a similar one for plate 4 except that additional, small, holes would be placed between the holes 23. These small holes would simply reduce the area of plate 4 and not have counterparts on plate 5.

Figure 3:
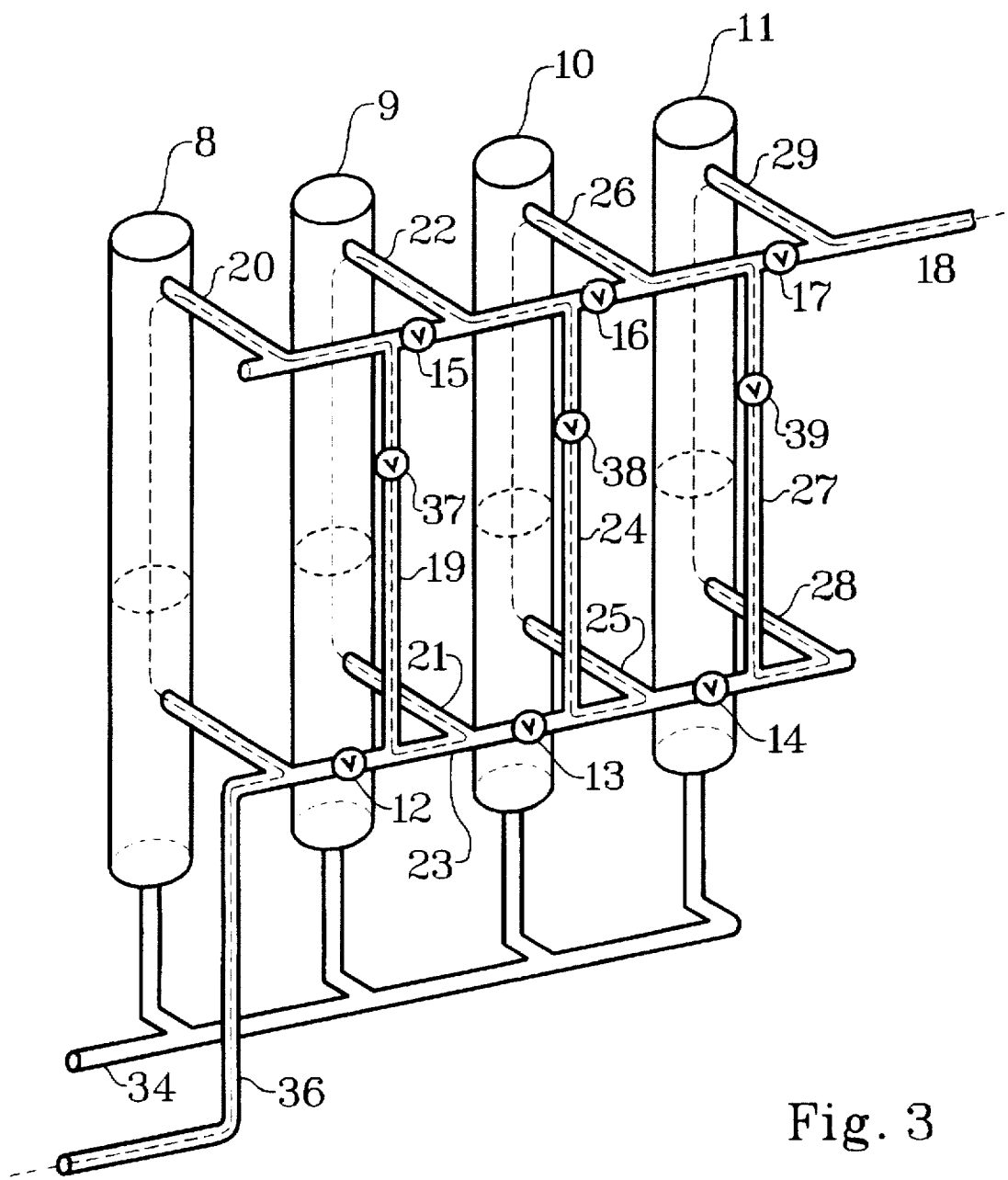
FIG. 3 is a more or less diagrammatic flow sheet representing four of my vessels connected in series.

In FIG. 3, four vessels similar to vessel 1 are shown. The piping is configured so vessels 8, 9, 10, and 11 may be connected in series or parallel. In FIG. 3, the gas flow is shown in series; flow in each of the vessels 8, 9, 10, and 11 is from bottom to top, thus the gas in each case flows from the outlet of one vessel to the inlet of the next, and accordingly valves 12, 13, 14, 15, 16 and 17 are closed. Flow proceeds from the outlet 20 of vessel 8 through vertical pipe 19 to inlet 21 of vessel 9, from outlet 22 of vessel 9 through vertical pipe 24 to inlet 25 of vessel 10 and from outlet 26 of vessel 10 through vertical pipe 27 to inlet 28 of vessel 11. After passing through outlet 29 of vessel 11, the dried gas is directed through pipe 18 for consumption, storage, or further transmission.

When valves 12, 13, 14, 15, 16, and 17 are open and valves 37, 38, and 39 are closed, gas enters not only directly into vessel 8 from pipe 36 but also passes through valves 12, 13 and 14 to inlets 21, 25 and 28 to vessels 9, 10 and 11, exiting through outlets 22, 26, and 29 and directly into pipe 18, passing also valves 15, 16 and 17, thus operating the vessels in parallel.

Each of the vessels 8, 9, 10, and 11 has an internal construction similar to that shown in FIG. 1; in particular, each has perforated plates 4, 5, and 6, and, as mentioned in connection with FIG. 1, each may have a volume of desiccant tablets on top of plate 6. The amount of desiccant tablets is a matter of discretion for the user—the vessels will perform to remove moisture from the gas without the tablets.

It is not necessary that the gas flow be upwards through the vessel, so long as the gas contacts the carbon steel plate before the stainless steel plate with which it is in contact

I claim:

1. Apparatus for drying flowing gas comprising a vessel having a gas inlet and a gas outlet, a pair of perforated plates transverse the interior of said vessel, said pair of perforated plates comprising a carbon steel perforated plate facing said gas inlet and a stainless steel perforated plate in contact with said carbon steel perforated plate, and a third perforated plate transverse the interior of said vessel and spaced from said pair of perforated plates in a direction facing said gas outlet.

2. Apparatus of claim 1 wherein said third perforated plate is carbon steel.

3. Apparatus of claim 1, including a plurality of desiccant tablets on top of said third perforated plate.

4. Apparatus for drying gas obtained from a pipeline wherein said gas is flowing, comprising a plurality of vessels having a gas inlet and a gas outlet connected in series, said vessels each comprising a cylinder of a diameter greater than said pipeline, two perforated plates of different metals in contact with each other and arranged transverse of said vessel so the gas from said gas inlet contacts the more anodic metal first, and a third perforated plate transverse said vessel and spaced between said two perforated plates in contact with each other and said gas outlet.

5. Apparatus of claim 4 including a plurality of desiccant tablets between said third perforated plate and said gas outlet.

6. Apparatus of claim 4 wherein said two perforated plates of different metals in contact with each other have different areas.

7. Apparatus of claim 1 including at least one area for collecting water.

8. Method of removing moisture from gas comprising passing said gas through the apparatus of claim 1 at a velocity of 1-2 feet per second and accumulating moisture formed in said apparatus from said gas.

9. Method of removing moisture from gas comprising passing said gas through the apparatus of claim 4 at a velocity of 1-2 feet per second and accumulating moisture formed in said apparatus from said gas.

10. Method of claim 8 wherein said gas is natural gas.

11. Method of claim 9 wherein said gas is natural gas.

* * * * *